United States Patent [19]
MacPike et al.

[11] 3,977,697
[45] Aug. 31, 1976

[54] LONG TRAVEL REAR WHEEL SUSPENSION SYSTEM FOR MOTORCYCLE

[76] Inventors: Kenneth A. MacPike, P.O. Box 203; Paul E. Pence, P.O. Box 402, both of, Destin, Fla. 32541

[22] Filed: Apr. 15, 1975

[21] Appl. No.: 568,322

[52] U.S. Cl. ............................ 280/284; 308/DIG. 9
[51] Int. Cl.² ........................................ B62K 25/10
[58] Field of Search ............... 280/284, 124 R, 285; 308/DIG. 9

[56] References Cited
UNITED STATES PATENTS

| | | | |
|---|---|---|---|
| 625,456 | 5/1899 | Mills | 280/284 |
| 714,121 | 11/1902 | Williams | 280/284 |
| 1,272,399 | 7/1918 | Douglas | 280/284 |
| 3,096,128 | 7/1963 | Wight | 308/DIG. 7 |
| 3,298,713 | 1/1967 | Plain | 280/284 |

FOREIGN PATENTS OR APPLICATIONS

| | | | |
|---|---|---|---|
| 513,889 | 2/1955 | Italy | 280/284 |
| 18,229 | 10/1892 | United Kingdom | 280/284 |

*Primary Examiner*—M. H. Wood, Jr.
*Assistant Examiner*—Terrance L. Siemens
*Attorney, Agent, or Firm*—Lowe, King, Price & Markva

[57] ABSTRACT

A lever and stabilizer bar assembly, attached to the rear suspension system of a standard motorcycle, offsets the lower end of the rear shock from the standard lower shock mount on the swing arm. The leverage of the stabilizer bar and lever arm assembly increases the maximum vertical travel of the rear wheel and provides progressive resistance to rear wheel travel caused by loading of the suspension. The assembly is adjustable for attachment to any standard motorcycle without cutting or welding the frame. Nylon bushings incorporated in pivot mounts between the lever arm and stabilizer bar, and between the assembly and motorcycle frame augment damping and decrease loading of the shocks.

10 Claims, 5 Drawing Figures

LONG TRAVEL REAR WHEEL SUSPENSION SYSTEM FOR MOTORCYCLE

BACKGROUND OF THE INVENTION

The present invention relates generally to resilient rear wheel suspension systems, and more particularly to a leverage assembly attached to the rear shocks and frame of a standard motorcycle to increase the maximum vertical travel of the rear wheel and provide progressive resistance to rear wheel vertical travel caused by loading of the suspension.

In motocross or other rough terrain riding, the rear suspension system of a standard motorcycle is generally modified to increase the maximum vertical travel of the rear wheel. This is done to minimize the motorcycle "bottoming out" under extreme loading. In a standard, stock motorcycle, each rear shock absorber, which is generally an air or oil cooled adjustable unit, is pivotally connected to the motorcycle frame just below the seat at one end, and to the swing arm slightly forward of the rear wheel axle at the other end. This arrangement typically provides approximately 3 or 4 inches of maximum vertical travel or "arc" of the rear wheel. Although this is adequate for road riding or even light scrambling, 7–10 inches is necessary for motocross riding, particularly for competition.

In the past, the standard techniques for increasing the maximum vertical travel of the rear wheel have been to (1) move the lower end of each shock absorber forward of the standard lower shock mounts on the swing arms, (2) move the upper end of each shock absorber forward of the standard upper shock mounts or (3) move both the upper and lower ends of each shock absorber forward of the standard upper and lower shock mounts.

While generally somewhat satisfactory, these three techniques require substantial technical expertise because the rear suspension of a motorcycle significantly affects handling and is critical for competition riding. In addition, these techniques require cutting or welding the frame and are impracticable for the novice rider.

Moving either the lower or upper end of each shock absorber forward of the standard shock mount, known as the angled shock techniques (techniques 1 and 2), causes the rear wheel suspension system to exhibit a regressive resistance characteristic, i.e., becomes softer with loading of the suspension. This is because the shocks divert from their normal (stock) orientation with respect to the arc described by the rear wheel with loading and thus provide a resistance to rear wheel loading that decreases as the wheel approaches the top of its travel. This characteristic encourages an undesirable "bottoming out" of the motorcycle.

In order to compensate for regressive rear wheel resistance in angled shock suspensions, enduro motorcycles utilize spring-type shock absorbers that are extra heavy-duty, but extra heavy-duty shocks cause the suspension to be too stiff when the suspension is lightly loaded. A progressive spring shock absorber is used in some enduro motorcycles to partially offset the regressive resistance characteristic of the suspension. The progressive shock has a non-linear helical spring which provides a resistance to wheel travel that increases as the spring is compressed, i.e., becomes stiffer with loading of the suspension. Although the progressive shock partially offsets the inherent regressive resistance characteristic of the angled shock techniques, compensation is incomplete especially in the long travel rear wheel suspensions used for competition riding.

The technique of moving both the upper and lower ends of each shock forward of the standard upper and lower shock mounts (technique 3) provides a constant resistance characteristic to vertical rear wheel travel. The constant resistance characteristic is unsuitable for motocross riding using this arrangement because the shocks are unable to handle the increased moment of inertia of the rear wheel with respect to the shocks caused by the increased distance between the rear wheel axle and the shocks.

A somewhat increased moment of inertia of the rear wheel with respect to the shocks also exists in the aforementioned angled shock techniques, due to the increased distance between the shocks and rear wheel, whereby the shocks are more heavily loaded during riding and tend to overheat and fail at an excessive rate. In all three techniques the increased moment of inertia of the rear wheel creates increased stress on the frame of the motorcycle and the frame requires reinforcement.

Accordingly, one object of the present invention is to provide a new and improved rear wheel suspension for a motorcycle.

Another object of the present invention is to provide a motorcycle suspension system having increased maximum rear wheel vertical travel.

Another object of the present invention is to provide a rear wheel suspension system for a motorcycle which provides progressive resistance to rear wheel vertical travel.

Another object of the present invention is to provide a heavy-duty rear wheel suspension system that is attachable to a standard motorcycle without requiring special tools or technical expertise.

Another object of the present invention is to provide a new and improved rear wheel suspension system for a motorcycle which permits heavy-duty riding, such as motocross, without requiring extra heavy-duty shocks.

Another object of the present invention is to provide a rear wheel suspension system for a motorcycle which permits heavy-duty riding, such as motocross, without substantially increasing stress on the frame.

SUMMARY OF THE INVENTION

In accordance with the basic principles of the invention, a lever arm and stabilizer bar assembly is connected to the rear wheel suspension system of a standard motorcycle. The assembly offsets the lower end of the rear whock from the standard lower shock mount on the swing arm of the motorcycle and uses leverage to increase the maximum vertical travel of the rear wheel and provide progressive resistance to rear wheel vertical travel caused by loading.

More particularly, on each side of the motorcycle, the lower end of a lever arm is pivotally attached to the standard lower shock mount on the swing arm of the motorcycle, and a stabilizer bar is pivotally supported between the seat-supporting portion of the motorcycle frame and the upper end of the lever arm. A tubular shock absorber, which is preferably a conventional helical spring shock, either of the straight spring or progressive spring type, is supported between the standard upper shock mount and an intermediate pivot mount on the lever arm. The intermediate pivot mount is located on the lever arm such that the shock is maintained in line between the upper shock mount and rear wheel axle.

During the installation of the lever arm and stabilizer bar assembly to the suspension system on each side of the rear wheel, attachment of the stabilizer bar to the lever arm is made such that the angle between the shock absorber and lever arm is greater than 90° when the rear wheel is at the lower end of its vertical travel (unloaded). The angle progressively decreases to approximately 90° as the rear wheel approaches the upper end of its vertical travel (fully loaded). Resistance to rear wheel loading is proportional to the sine of the angle between the lever arm and shock absorber. Accordingly, the resistance is minimal when the wheel is at the lower end of its vertical travel, and progressively increases as the rear wheel approaches the upper end with loading of the suspension. Thus, one effect of the lever arm and stabilizer bar assembly is to provide a progressive resistance characteristic to a straight spring rear wheel suspension, or to increase the rate of progression of a progressive spring suspension.

The lever arm and stabilizer bar assembly also increases the maximum vertical travel of the rear wheel because the intermediate pivot mount of the lever arm carrying the lower end of the shock absorber swings through an arc that is non-tangential to the axis of the shock and is shorter than the arc described by the swing arm of the motorcycle frame during loading of the suspension. The result is less compression of the shocks. The smaller arc also reduces loading of the shocks so that special heavy-duty shocks do not have to be used, and no new stress is applied to the frame.

Two embodiments of the lever arm and stabilizer bar assembly are disclosed. In one embodiment, the lever arm has a substantially straight configuration with front, intermediate and rear pivot mounts located substantially in-line with each other. The intermediate pivot mount, supporting the lower end of the shock, is located between the front and rear mounts so as to maintain the shock in alignment between the upper shock mount and the rear wheel axle as the suspension is loaded. The progressively decreasing angle (the angle approaches 90°) between the straight lever arm and shock, as well as the short arc, non-tangential to the shock, described by the intermediate pivot mount (carrying the lower end of the shock) provide the desired increased maximum vertical travel of the rear wheel and progressive resistance to loading.

In the other embodiment, the lever arm has a bow-shaped configuration and the rear pivot mount of the lever arm swings away from the axis of the shock as the suspension is loaded. This causes the lower end of the shock to swing through an even smaller arc with loading of the suspension, as well as to cause the angle between the lever arm and shock to more rapidly approach 90° as the suspension is loaded. The results are even greater maximum vertical wheel travel and progressive resistance suitable for competition riding.

Plastic, such as nylon, bushings, incorporated in the pivot mounts increase the damping of the suspension system and augment the shock absorbers in controlling the momentum of the swing arm and rear wheel. This permits the shock absorbers to operate at lower damping levels and at reduced energy dissipation for a given amount of loading of the suspension.

Still other objects and advantages of the present invention will become readily apparent to those skilled in this art from the following detailed description, wherein we have shown as described only the preferred embodiments of the invention, simply by way of illustration of the best mode contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE PREFERRED EMBODIMENTS

Figure 1:
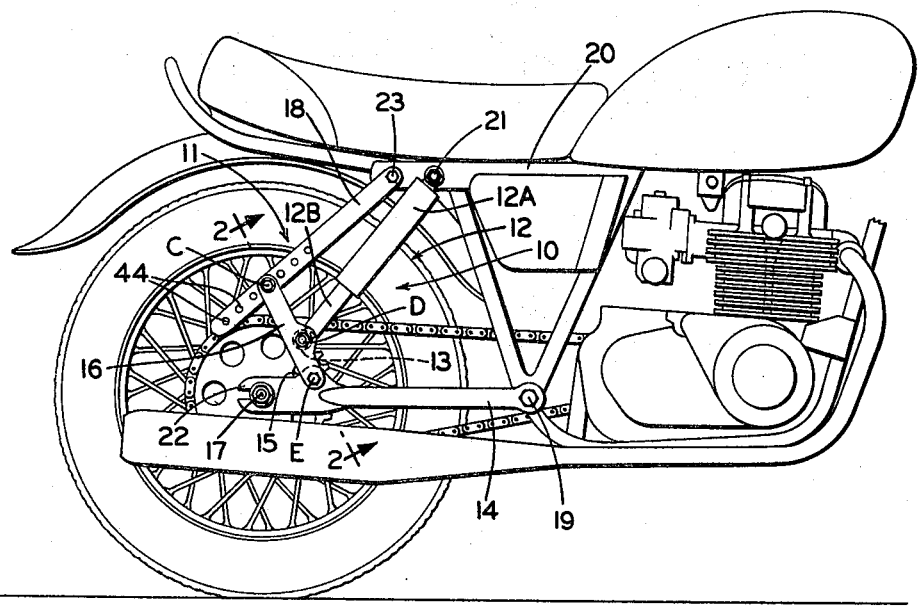
FIG. 1 is a side view of a motorcycle incorporating one embodiment of the rear wheel suspension system of the present invention.

Referring to FIG. 1, there is illustrated a motorcycle incorporating a rear wheel suspension system 10 which uses the leverage of a lever arm and stabilizer bar assembly 11 to increase the maximum vertical travel of the rear wheel over that of a standard motorcycle, and to provide progressive resistance to the vertical travel as the suspension is loaded. The term "progressive resistance" refers to the suspension system providing a resistance to vertical travel of the rear wheel that progressively increases as the rear wheel approaches its upper end or limit caused by loading of the suspension.

In a standard lightweight motorcycle, such as a Honda CL175, a standard upper shock mount 21 and standard lower shock mount 15 are provided on each side of the motorcycle for mounting a conventional tubular shock absorber 12. Shock absorber 12 comprises coaxial inner and outer members 12A and 12B relatively movable axially so as to compress a helical spring or annular rubber element mounted on the inner member. The shocks 12 are preferably of the helical spring type and the springs may be either straight or progressive. The upper shock mount 21 is formed on a seat-supporting portion 20 of the motorcycle frame and the lower shock mount 15 is formed on the swing arm 14 somewhat forward of the rear wheel axle 17. The rear wheel axle 17 is rotatably supported by a fork member 22 at one end of the swing arm 14; the other end of the swing arm is attached to the frame of the motorcycle at pivot mount 19.

In accordance with the present invention, the lower end 13 of shock 12 is attached to intermediate pivot mount D of a lever arm 16 rather than to the standard lower shock mount 15. The lever arm 16 offsets the lower end 13 of shock 12 from the standard lower shock mount 15 and uses leverage to provide increased maximum rear wheel vertical travel and progressive resistance to rear wheel vertical travel caused by loading of the suspension 10.

Figure 2:
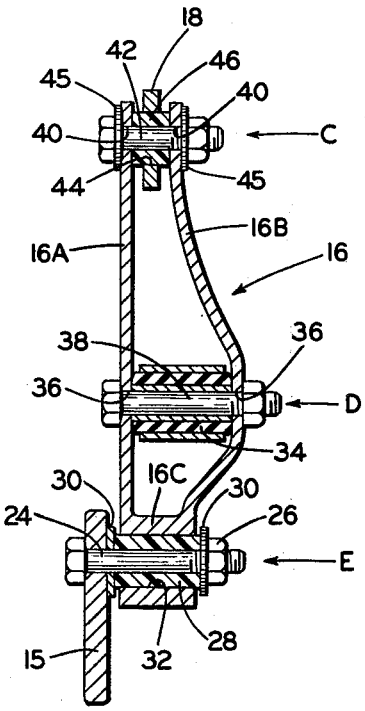
FIG. 2 is a cross-sectional view of the lever arm taken along the line 2—2 in FIG. 1.

In the embodiment configuration FIG. 1, lever arm 16 has a substantially straight configurationn and contains three pivot mounts C, D and E arranged substantially in-line with each other. Intermediate pivot mount D is located between front pivot mount E and rear pivot mount C such that the length of arm portion E-D is approximately one-third that of arm portion E-C whereby shock 12 is maintained in-line with upper shock mount 21 and rear wheel axle 17. Lever arm 16 is attached to the standard lower shock mount 15 at front pivot mount E (see FIG. 2) using a bolt 24 and a lock nut 26. A nylon bushing 28 is incorporated between lever arm 16 and bolt 24 to provide additional damping to suspension 10, and pair of spacer washers 30 are preferably incorporated on each side of the bushing.

Lever arm 16 is approximately U-shaped in cross-section (see FIG. 2) with legs 16A and 16B joined together at a base portion 16C. The base portion 16C contains an aperture 32 forming the front pivot mount E. Leg 16A of lever arm 16 has a straight cross-section while the cross-section of leg 16B is bowed outwardly to receive a nylon lower shock mount bushing 34. Apertures 36 in legs 16A and 16B, forming intermediate pivot mount D, receive a standard lower shock mounting bolt 38.

The upper end portions of the lever arm legs 16A and 16B are substantially parallel to each other and contain a pair of apertures 40 forming rear pivot mount C. A bolt 42 extends through a pair of apertures 40 and one of a plurality of apertures 44 on stabilizer bar 18 (see FIG. 1). A nylon bushing 46 is push-fitted through said one aperture 44 on stabilizer bar 18. The bushing 46 spaces apart legs 16A and 16B while contributing to the damping of the suspension system 10. A pair of washers 45 are preferably incorporated on bolt 42 at the outer surfaces of the legs 16A and 16B to reinforce the apertures 40. Bolt 42, washers 45 and nylon bushing 46 pivotally join the lever arm 16 to the lower end of stabilizer bar 18; the upper end of stabilizer bar 18 is attached to the seat-supporting portion 20 of the frame at pivot mount 23 just to the rear of the standard upper shock mount 21. A nylon bushing (not shown) is inserted in the aperture forming pivot mount 23 in the frame portion 20. The bushing, as well as bushings 28, 34 and 46, provides some damping to the suspension 10 in addition to damping provided by shocks 12.

The aperture forming pivot mount 23 in the seat-supporting portion 20 of the frame is drilled approximately 1½ inches to 2½ inches to the rear of upper shock mount 21. In some motorcycles, there is not adequate space provided on the seat-supporting portion 20 of the frame and it is necessary to mechanically attach a small tab (not shown) to the rear of upper shock mount 21. An aperture is then formed in the tab for mounting the stabilizer bar 18 thereto.

During installation of the stabilizer bar and lever arm assembly 11 to the rear wheel suspension system 10 of the motorcycle, the lower end 13 of each shock 12 is removed from the standard lower shock mount 15 on each side of the motorcycle. Then lever arm 16 is attached to the standard lower shock mount 15 and the upper end of stabilizer bar 18 is attached to portion 20 of the motorcycle frame at pivot mount 23. The lower end 13 of shock 12 is attached to the lever arm 16 at intermediate pivot mount D. With the motorcycle up on its stand (not shown) and the rear wheel at the lower end of its travel, rear pivot mount C of lever arm 16 is joined to stabilizer bar 18 (see FIG. 2) at the closest one of apertures 44. With the rear wheel at the lower end of its travel (suspension unloaded) the angle $\phi$ between the shock 12 and portion D-E of lever arm 16 is greater than 90° (FIG. 3); as the rear wheel approaches the upper end of its vertical travel (rear suspension fully loaded) the portion D-E of lever arm 16 becomes substantially perpendicular to shock 12.

Figure 3:
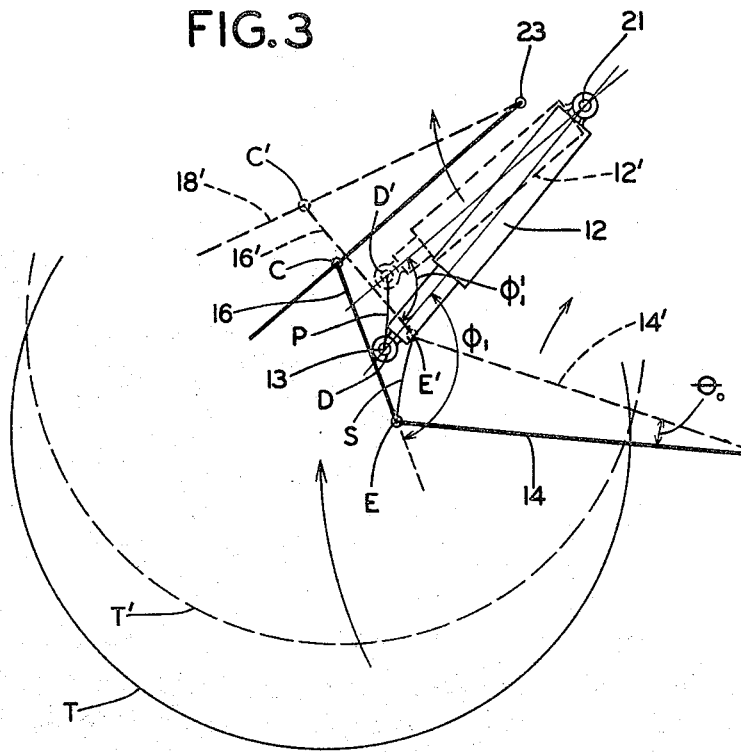
FIG. 3 is a schematic representation of the rear wheel suspension system of FIG. 1 for describing the operation thereof.

The leverage of stabilizer bar and lever arm assembly 11, and change of angle between the lever arm and shock 12 as a function of loading of the rear wheel suspension system 10, will now be described in more detail with reference to FIG. 3. FIG. 3 is a schematic representation of the action of shock absorber 12 as it swings between the lower, unloaded position represented by the numeral 12 and the upper, fully loaded position represented by the numeral 12'. For simplicity, swing arm 14, lever arm 16 and stabilizer bar 18 are schematically represented as straight lines.

Assume that swing arm 14 swings through an angle $\theta_0$ as the rear wheel travels between its lower end of vertical travel (represented by the letter T) and upper end (represented by the letter T'). An arc S described by pivot mount E on standard lower shock mount 15 as the mount is displaced from E to E' has a length $R\theta_0$, where R is the length of swing arm 14. Although not shown, it should be understood that when the shock 12 is mounted at its standard position, i.e., with lower end 13 attached to lower shock mount 15, the angle $\phi$ between the shock and swing arm 14 remains approximately constant throughout the angle of rotation $\theta_0$ of the swing arm. Also, in the standard position, shock 12 becomes compressed by an amount $R\theta_0$ since therein the shock is tangent to arc S. However, when the lower end 13 of shock 12 is mounted to the lever arm 16 at intermediate pivot amount D in accordance with the present invention, the angle $\phi$ between the shock and lever arm progressively decreases from a value $\phi_1$ ($\phi_1 > 90°$) to a value $\phi_1'$ ($\phi_1' \approx 90°$) as the rear suspension 10 is loaded. Further, as discussed below, arc P, described by lower end 13 of shock 12 is non-tangential to the shock causing less axial compression thereof.

As aforementioned, the leverage provided by stabilizer 18 and lever arm 16 has two effects on the suspension system 10, i.e., increased maximum rear wheel vertical travel and progressive resistance to rear wheel vertical travel caused by loading of the rear suspension. Still referring to FIG. 3, as swing arm 14 is caused to rotate through the angle $\theta_0$ in response to loading of the rear suspension system 10, lever arm 16 is displaced to the lever arm position 16' and stabilizer bar 18 is displaced to stabilizer bar position 18', represented by dotted lines.

As suspension system 10 is loaded, the lower end 13 of shock 12 swings through an arc P from pivot mount position D to pivot mount position D'. The arc P is difficult to describe mathematically due to the displacement of both pivot mounts C and E of lever arm 16; however, it can be seen that arc P is somewhat shorter than arc S and that the axis of shock 12' is non-tangential to the arc P. This causes less compression of shock 12 for a given angle of rotation $\theta$ of the swing arm 14 and permits the rear wheel of the motorcycle to swing through a longer arc before the shock "bottoms out." Stated another way, there is provided increased maximum vertical travel of the rear wheel.

For further description as to the second effect, i.e., the stabilizer bar and lever arm assembly 11 causing shock 12 to exhibit a progressive resistance to vertical rear wheel travel, reference may also be made to FIG.

3. Progressive resistance to vertical rear wheel travel is provided even if a straight spring shock is used. However, if a progressive spring shock is used, the assembly 11 increases the rate of progression of the spring. This can be understood, again referring to FIG. 3, by observing that the angle $\phi$ between portion D-E of lever arm 16 and shock 12 is greater than 90°, but as the shock 12 is pivoted to the position illustrated by the numeral 12′, the angle $\phi$ decreases to 90° (at $\phi = \phi_1'$). Since the resistance that a shock absorber exerts against a lever, such as a swing arm, is proportional to the sine of the angle between the shock and the lever, it is clear that the resistance progressively increases from a minimum at $\phi = \phi_1 > 90°$ to a maximum at $\phi = \phi_1' = 90°$.

The progressive resistance to vertical wheel travel provided by stabilizer bar and lever arm assembly 11 in cooperation with shock 12 thus obviates the rerquirement of extra heavy-duty shocks for motocross riding. The increasing resistance or "stiffness" of the shocks as the angle $\phi$ between the lever arm 16 and shock 12 approaches 90° ($\phi = \phi_1'$) minimizes "bottoming out" of the shocks. This is so even during severe loading by extremely rough terrain. Yet the reduced resistance at $\phi = \phi_1$ insures a smooth ride when the suspension system 10 is lightly loaded, such as during street riding. Since the standard shocks do not have to be replaced by extra heavy-duty shocks for motocorss riding as in the prior art, no new stress is exerted on the frame of the motorcycle. As an additional advantage, since the lower end 13 of the shock is not displaced forward of its standard position at lower shock mount 15, the rear wheel does not exhibit a greater than standard moment of inertia with respect to the shocks, and over-heating of the shocks 12 does not occur.

We have found that the stabilizer bar and lever arm assembly 11 of FIG. 1 provides a rear wheel vertical travel of up to 6 to 8 inches (compared to 3 or 4 inches in the stock motorcycle). However, for competition motocross riding, 9 or 10 inches of rear wheel vertical travel is desirable. Such an extra long rear wheel travel is provided by the embodiment of the invention shown in FIGS. 4 and 5.

Figure 4:
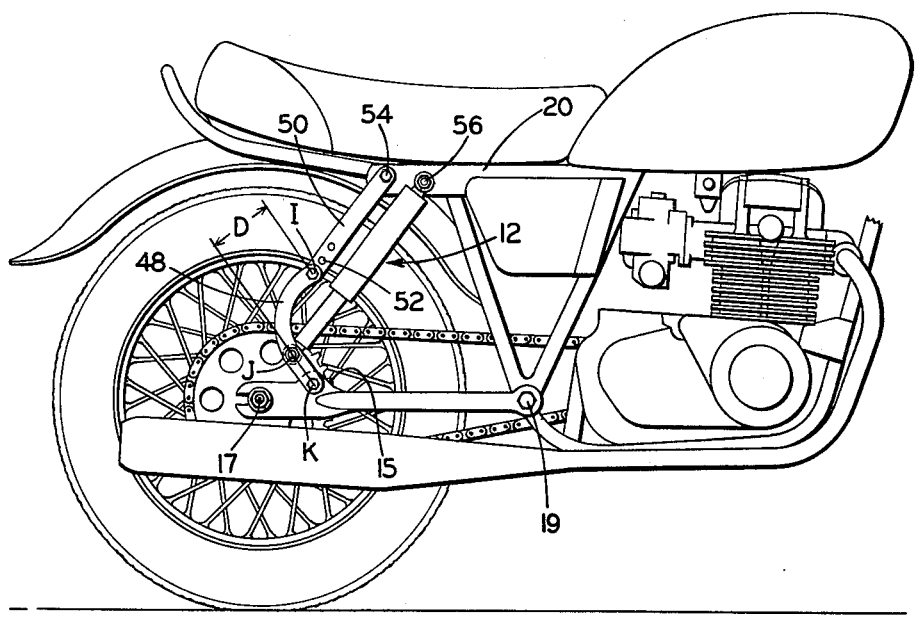
FIG. 4 is a side view of a motorcycle incorporating another embodiment of the rear wheel suspension system.
Figure 5:
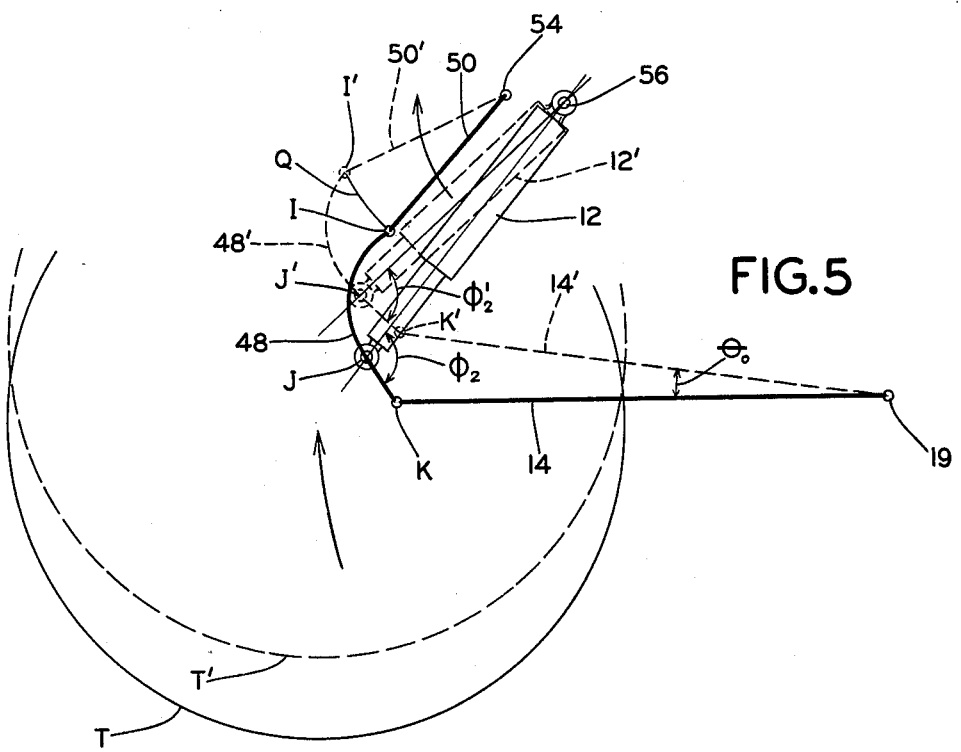
FIG. 5 is a schematic representation of the embodiment of FIG. 4 for describing the operation thereof.

In FIGS. 4 and 5, lever arm 48 is curved (bow-shaped) and connected to one of a plurality of apertures 52 in stabilizer bar 50 at rear pivot mount I. Rear mount I is located above a line containing pivot mounts J and K by a distance D and is somewhat closer to the axis of shock 12 than is front pivot mount K. The upper end of stabilizer bar 50 is attached to the seat-supporting portion 20 of the motorcycle from at pivot mount 54, and pivot mount K at the lower end of lever arm 48 is connected to the standard lower shock mount 15 on swing arm 14 of the motorcycle. Shock 12 is mounted between shock mount 56 on upper frame portion 20 and intermediate pivot mount J on lever arm 48. Intermediate pivot mount J is located on lever arm 48 such that shock 12 is in-line between standard upper shock mount 56 and rear wheel axle 17. In practice, the length of portion K-J on lever arm 48 is approximately one-third the length of portion K-I. The cross-section (not shown) of lever arm 48 is similar to that of lever arm 16 shown in FIG. 1, i.e., it is substantially U-shaped with the central portion being outwardly bowed to receive the lower shock mount bushing of shock 12. Nylon bushings (not shown) are provided at pivot mounts 54, I, J and K, similarly to those shown in the embodiment of FIG. 1, to augment damping of the rear suspension by the shock absorber 12.

Referring to FIG. 5, when the rear suspension 10 is sufficiently loaded so that the rear wheel is displaced from its lowest end of vertical travel T to its highest end T′, lever arm 14 rotates through angle $\theta_0$ to the fully loaded position designated by the numeral 14′. The rear pivot mount I swings outwardly from shock 12 along an arc Q to the position designated by pivot mount I′. The angle $\phi$ between portion J-K of lever arm 48 and the shock 12 is substantially greater than 90° at $\phi = \phi_2$ and progressively approaches 90° at $\phi = \phi_2'$ when the rear wheel is at the upper end of its vertical travel. The outswing described by the rear pivot mount I in FIG. 5 permits a longer arc S than that in FIG. 3 to be described by pivot mount K for a given amount of axial compression of the shock 12. Accordingly, the embodiment of the invention illustrated in FIGS. 4 and 5 provides an extremely long vertical travel of the rear wheel and in practice, we have found that over 10 inches of maximum vertical travel is attainable with a standard stock motorcycle.

As the rear wheel is loaded between the lower end of vertical travel T and upper end T′, the angle $\phi$, varying between the values $\phi_2$ and $\phi_2'$, rapidly approaches 90° due to the outswing of rear pivot mount I. Thus, the resistance of suspension system 10 in FIGS. 4 and 5 becomes substantially stiffer as shock 12 is compressed. The rate of progression of the resistance characteristic provided by the embodiment of FIGS. 4 and 5 is even greater than that exhibited by the embodiment of the invention shown in FIGS. 1 and 3 because as the upper end of lever arm 48 swings away from the axis of shock 12 with loading of the suspension, the lower portion J-K of the lever arm 48 at pivot mount J swings upwardly into the axis of the shock absorber 12. As this occurs, the angle $\phi$ between the lever arm and shock very rapidly approaches 90° providing the desired enhanced progressive resistance characteristic. The enhanced progressive resistance characteristic of the embodiment of FIGS. 4 and 5 permits an even lighter shock loading to be experienced by the suspension 10, and since resistance to rear wheel vertical movement is soft at light loads, an exceptionally smooth road ride is provided.

In summary, there is provided a stabilizer bar and lever arm assembly 11 that is attached to the rear suspension system 10 of a standard motorcycle to increase the maximum vertical travel of the rear wheel and provide a progressive resistance to rear wheel vertical travel caused by loading of the rear wheel suspension. Nylon bushings incorporated in the pivot mounts of the assembly augment the damping of the shocks and help reduce heating and failure rate of the shocks. Of particular importance, the stabilizer bar and lever arm assembly can be attached to any standard motorcycle frame without requiring technical expertise or special tools such as metal cutting or welding equipment. Since the stabilizer bar and lever arm assembly 11 provides a progressive resistance to rear wheel vertical travel, a standard-equipped shock absorber may generally be used, even for motocross riding. No additional stress is applied to the frame elements of the motorcycle.

In this disclosure, there is shown and described only the preferred embodiments of the invention but as aforementioned it is to be understood that the invention is capable of various changes and modification within the scope of the inventive concept as expressed by the accompanying claims.

What is claimed is:

1. A leverage assembly for a resilient rear wheel suspension system of a motorcycle, said motorcycle including a frame and a rear wheel, a seat mounted to an upper portion of said frame, and a swing arm, one end of said swing arm pivotally attached to a lower portion of said frame, the other end of said swing arm rotatably supporting said rear wheel, comprising tubular shock absorber means, said shock absorber means having a predetermined resistance to axial compression, an upper end of said shock absorber means being pivotally attached to said upper portion of said frame; leverage means pivotally attached to said upper portion of said frame and said swing arm, including lever arm means attached to a lower end of said shock absorber means, said lever arm means and shock absorber means intersecting each other at an angle that is greater than 90° when said rear wheel is at the lower end of its vertical travel and at an angle that is substantially equal to 90° when said rear wheel is at the upper end of its vertical travel, said leverage means providing a resistance to vertical travel of said rear wheel that progressively increases to a maximum resistance as said rear wheel approaches its upper end of vertical travel, a rate of progression of the resistance of said leverage means being greater than a rate of progression of the resistance of said shock absorber means.

2. The assembly of claim 1 wherein said leverage means is attached to said fraame with pivot mounts, said pivot mounts including bushing means for damping said suspension system.

3. The assembly of claim 1 including means for adjusting a resistance characteristic of said suspension system.

4. The assembly of claim 3 wherein said adjusting means includes means for adjusting the angle between said lever arm means and the axis of said shock absorber means when said rear wheel is at a predetermined portion of its vertical travel.

5. A leverage assembly for a resilient rear wheel suspension system of a motorcycle, said motorcycle including a frame and a rear wheel, a seat attached to an upper portion of the frame, and a swing arm, one end of said swing arm pivotally attached to a lower portion of said frame, the other end of said swing arm rotatably attached to said rear wheel, comprising:

a lever arm, a lower end thereof being pivotally attached to said swing arm adjacent the axle of said rear wheel;

a stabilizer bar, a lower portion of said stabilizer bar being pivotally attached to an upper end of said lever arm, an upper end of said stabilizer bar being pivotally attached to said upper portion of the frame; and an elongated shock absorber, a lower end thereof being pivotally attached to said lever arm at an intermediate pivot mount between said upper and lower ends of said arm, an upper end of said shock absorber being pivotally attached to said upper portion of the frame adjacent said stabilizer bar, an arc described by said intermediate portion of said lever arm during loading of said suspension system being shorter than an arc described by said portion of said swing arm attached to said lever arm, said arc described by said intermediate portion further being non-tangential to the axis of said shock absorber;

said suspension providing a resistance to vertical travel of said rear wheel, said resistance increasing progressively as a function of the vertical travel of said rear wheel, and having a rate of progression greater than a rate of progression of said shock absorber.

6. The assembly of claim 5 wherein said intermediate pivot mount is located on said lever arm at a distance of approximately D/3 from an end of said lever arm, where D is the length of said lever arm.

7. The assembly of claim 6 wherein said lever arm has a substantially straight configuration.

8. The assembly of claim 6 wherein said lever arm has a bow-shaped configuration.

9. The assembly of claim 5 wherein said stabilizer bar contains a plurality of apertures, said upper end of said lever arm being pivotally attached to one of said plurality of apertures for adjusting a resistance characteristic of said suspension system.

10. The assembly of claim 6 wherein said lever arm comprises a pair of legs forming a substantially U-shaped cross section, one of said legs of said arm being outwardly bowed to receive a lower shock mount bushing of said shock absorber.

* * * * *